United States Patent [19]

Bedortha et al.

[11] Patent Number: 5,000,710
[45] Date of Patent: Mar. 19, 1991

[54] DEEP WATER EXERCISE BELT

[75] Inventors: Diahanne Bedortha, Springfield; Richard L. Brown; Lewis C. Thorne, both of Eugene, all of Oreg.

[73] Assignee: Excel Sports Science, Inc., Eugene, Oreg.

[21] Appl. No.: 409,611

[22] Filed: Sep. 18, 1989

[51] Int. Cl.[5] .............................................. B63B 35/73
[52] U.S. Cl. ..................................... 441/129; 272/93; 441/113
[58] Field of Search ............... 441/129, 106, 108, 113, 441/114, 115, 116, 102; 272/71, 93, 99; 434/254, 262

[56] References Cited

U.S. PATENT DOCUMENTS

| | | | |
|---|---|---|---|
| 1,446,099 | 2/1923 | Marks | 441/111 |
| 2,940,453 | 6/1960 | Lerner | 441/102 |
| 3,049,735 | 8/1962 | Baker | 441/108 |
| 3,077,618 | 2/1963 | O'Link | 441/113 |
| 3,094,725 | 6/1963 | Martin, Jr. | 441/113 |
| 3,137,015 | 6/1964 | Lindeman | 441/113 |
| 3,138,809 | 6/1964 | Bergens | 9/339 |
| 4,547,165 | 10/1985 | Scheurer et al. | 441/113 X |
| 4,689,030 | 8/1987 | McWaters | 441/106 X |

OTHER PUBLICATIONS

"Muscle & Fitness", Sep. 1985, vol. 46, No. 9, p. 166.
Japanese Official Gazette Disclosure 42855/72.

*Primary Examiner*—Sherman Basinger
*Attorney, Agent, or Firm*—John F. Ingman

[57] ABSTRACT

A deep water exercise belt, which supports the user in deep water in an upright, running position so as to allow vigorous exercise without placing body weight on the legs, involves a waist encircling belt of flexible buoyant material of uniform thickness which is shaped to provide greater flotation at the back of the user. Shaping includes an increased width of the belt on the back while forming the bottom of the belt to avoid hip motion of the user. The belt may be constructed of a chemically cross-linked polyethylene having an extremely fine closed-cell structure. The interior surface of the belt is smoothed so as to provide a suction effect against the body, while the exterior surface may be roughly textured to provide additional resistance to movement through water. A separate band of elasticized material is intertwined through the buoyant belt so as to buckle at the front of the user and hold the exercise belt in close contact with the waist. Holes may be formed through the exercise belt across the back portion and below the band to permit any entrapped water or air to escape therethrough.

7 Claims, 2 Drawing Sheets

DEEP WATER EXERCISE BELT

BACKGROUND OF THE INVENTION

1. Field of the Invention

This invention involves an exercise device for use in water, and, more particularly, a flotation belt, for use in deep water, which permits vigorous exercise in an upright, running position without placing body weight on the legs.

2. Description of the Prior Art

There is recognized benefit in exercising in water, in that one may condition the cardiovascular system while allowing time for injury recovery This is particularly true where an injury involves weight-bearing joints. Similarly, water training permits cardiovascular development without the pounding associated with land training Prior attempts to maintain the wearer in an upright, or running, position in deep water has included a flotation vest. However, such vests constrict breathing, and, since they ride upward on the body of the user, tend to irritate the skin, particularly under the arms. In order to alleviate the riding up effect of flotation vests, some have been provided with a crotch strap, which provides an additional location for skin irritation.

An exercise device for use in a tank containing water is described in U.S. Pat. No. 4,551,108 issued to Ernie Bass. This invention involves a buoyant vest in combination with a tank of water where security lines are connected adjacent to shoulder portions and/or waist portions of the vest. The security lines are attached to anchoring loops located on the upper edge of the tank so that the adjustable security lines provide supplemental buoyancy to that provided by the vest. The combination of a flotation vest, with its inherent disadvantages, and multiple lines attached between the user and a special tank, presents an undesirably complex and costly apparatus for water exercise. Furthermore, with such apparatus, a user is restricted to a specific location within the tank for his exercise activity.

What is needed is an exercise device for use in deep water which permits vigorous exercise in an upright, running position without placing body weight on the legs, and overcomes the disadvantages present in current floatation vests and associated apparatus.

SUMMARY OF THE INVENTION

The present invention provides a deep water exercise belt which meets the aforementioned need A buoyant belt is provided which supports the user in deep water in an upright, running position so as to allow vigorous exercise without placing body weight on the legs.

Accordingly, in the preferred embodiment, the deep water exercise belt includes a waist encircling belt of flexible buoyant material of uniform thickness which is shaped at the location corresponding to the back of the user so as to provide greater flotation at that position. Such shaping includes an increased width of the belt on the back while forming the bottom of the belt to avoid hip motion of the user. The belt is preferably constructed of a chemically cross-linked polyethylene, ethyl vinyl acetate based, having an extremely fine closed-cell structure. The interior surface of the belt is smoothed so as to provide a suction effect against the body. The exterior surface may be roughly textured to provide additional resistance to movement through water.

A separate band of elasticized material is intertwined through the buoyant belt so as to buckle at the front of the user and hold the exercise belt in close contact with the waist. Holes may be formed through the exercise belt across the back portion and below the band to permit any entrapped water or air to escape therethrough.

DESCRIPTION OF THE PREFERRED EMBODIMENT

Figure 1:
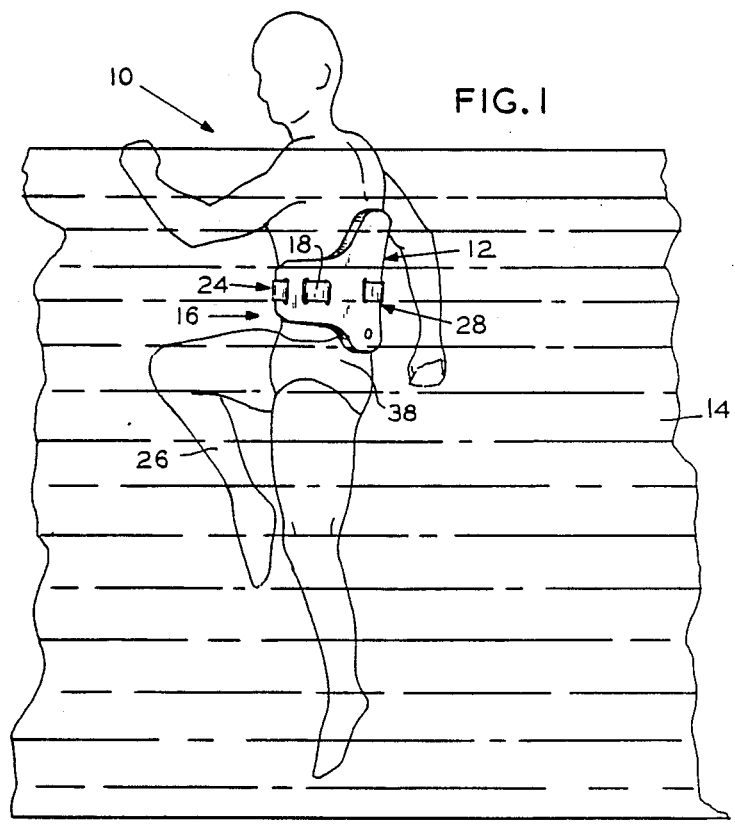
FIG. 1 illustrates a view of the deep water exercise belt fastened about the waist of a user engaged in running exercise in water.

Turning now to the drawings, there is shown in FIG. 1, a person 10 wearing the preferred deep water exercise belt 12 while engaged in running in an upright position in deep water 14, that is, water sufficiently deep so that the user's feet do not touch the bottom during exercise.

The flexible deep water exercise belt 12 is fastened about the waist 16 of the user 10 and is secured there by a band 18 fastening at the front in a conventional buckle, such as the quick release buckle 60 illustrated The band 18, preferably an elasticized web material, is fastened to the exercise belt 12 by intertwining through a series of eight elongated apertures 20 formed in the exercise belt 12 so as to press the inner surface 22 of the exercise belt 12 against the waist 16 of its user 10.

Figure 2:
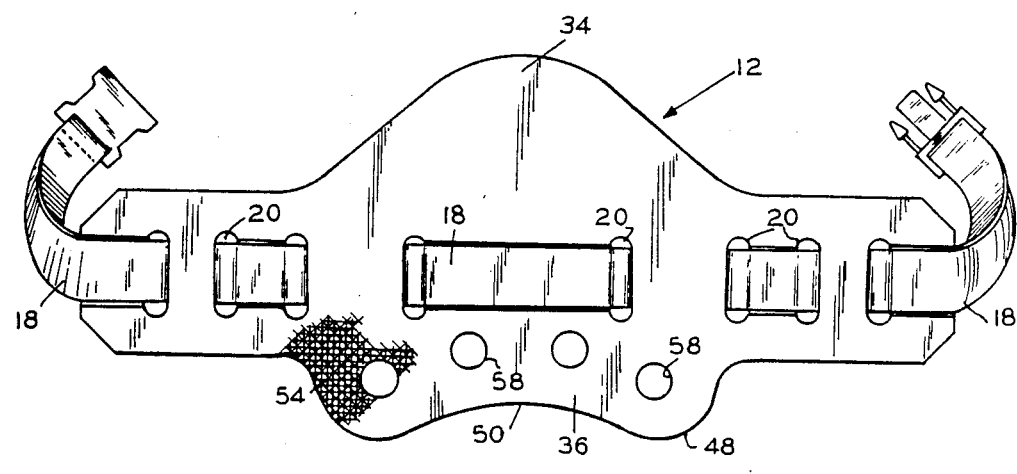
FIG. 2 illustrates a front elevation view of the deep water exercise belt of FIG. 1 in unbuckled form.
Figure 3:
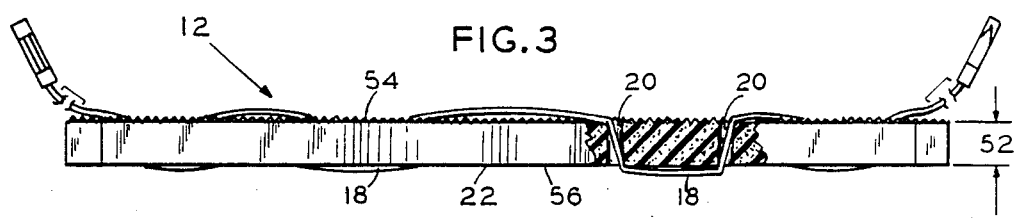
FIG. 3 illustrates a partially sectioned top view of the deep water exercise belt of FIG. 2.
Figure 4:
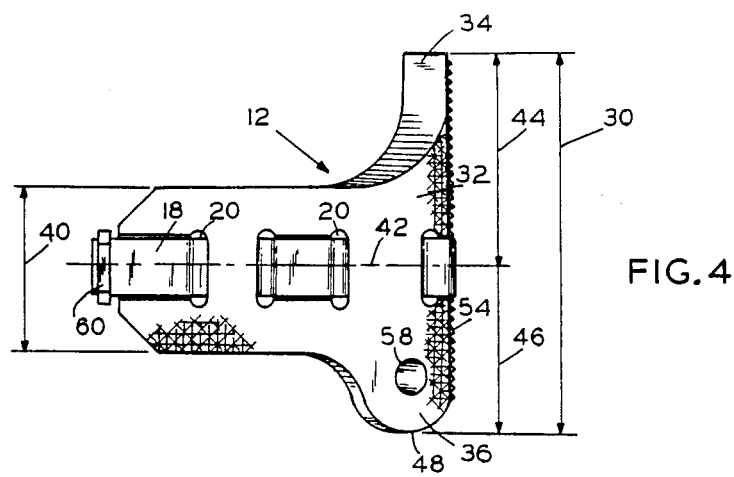
FIG. 4 illustrates a side elevation view of the deep water exercise belt of FIG, 1 in buckled form.
Figure 5:
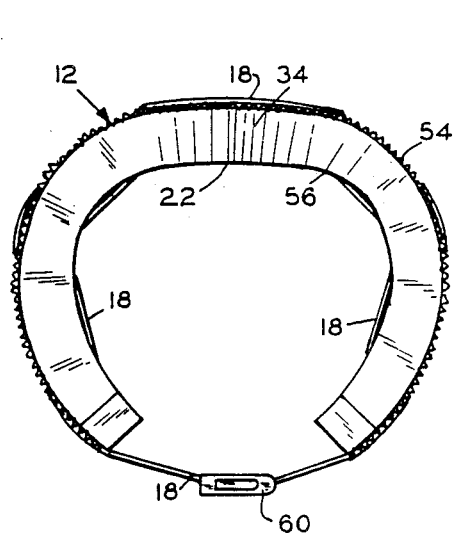
FIG. 5 illustrates a top view of the deep water exercise belt of FIG. 4.

In order to participate in deep water exercise, particularly a running or jogging motion which is excellent in conditioning the cardiovascular system while avoiding the pounding and weight bearing forces on legs created in land training, it is preferable to have an exercise belt 12 which provides sufficient buoyancy to keep the user in an upright position while exercising. In order to achieve an upright position while running, one must overcome two natural tendencies: first, a greater natural flotation of the front 24 of the person 10 due to the location of less dense body structure at that area, and second, the motion of the legs 26 during running, being substantially to the front 24 of the person 10, results in a backwards rotation of the person 10. Both of these tendencies are overcome in the deep water exercise belt 12 by providing greater flotation at the back 28 of the user. As seen in FIGS. 2 and 4, the width 30 of the exercise belt 12 has been increased across the back 32 of the belt 12 to provide such additional flotation. This is accomplished primarily by a widened portion 34 extending symmetrically upwards. To a lesser extent, the width of the belt 12 also is extended downward as illustrated at 36. However, it is important for effective running, and avoidance of frictional irritations, that the exercise belt be shaped to not interfere with hip 38 motion while exercising.

The preferred exercise belt 12 is constructed of a chemically cross-linked polyethylene, ethyl vinyl acetate based, having a extremely fine closed-cell structure. A preferred belt 12 has a 5½-inch width at the sides and front as seen at 40, 2¾-inches above and below the band 18 centerline 42. The belt 12 extends upward across its back 32 to a width 44 of approximately seven-inches above the centerline 42, while extending downwards variably between approximately 5-inches 46 at 48 and approximately 4-inches at the center 50. A thickness 52 of 1½ inches has been found to provide the necessary bouyancy generally for user weight up to 210 lbs. For users with greater weight, e.g. football players, a thickness of 1¾ inches desirably provides greater buoyancy Other uniform thicknesses 52 of belt 12 will provide different overall buoyancies as desired.

A roughly textured, or waffle-like outside surface 54 has been found to provide greater resistance to movement through water 14. It should be noted that the present deep water exercise belt 12 requires no external tether for additional bouyancy or control, and thus can be used anywhere in deep water 14. Movement about a swimming pool by deep water running is a usual routine.

Additionally, it has been found that a relatively smooth inside surface 56 of the belt 12 pressing against the user's 10 skin creates a suction effect for the belt 12 against the user 10, thus providing additional assurance that the belt 12 will be retained in desired position about the waist 16 of the user 10.

The belt 12 is conventionally formed by die-stamping a rough blank from a sheet of the above described material, then placing the blank into a thermal form which applies the textured outer surface 54 and the relatively smooth inside surface 56, as well as product identification and other items, such as a warning that the belt will not support a user in a face out-of-water position, as is desired in a life vest.

Figure 6:
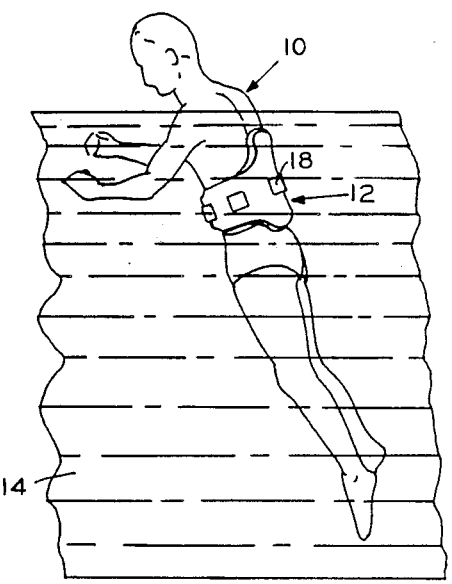
FIG. 6 illustrates the forward-leaning position of the belt wearer of FIG. 1 when not engaged in running exercise.

It is an important aspect of the belt 12 that it supports the user 10 in a slightly, e.g. 15 to 20 degrees, forward inclination while quietly floating, as shown in FIG. 6, so that, as described previously, the physical movements of exercise running will straighten the user to the upright position of FIG. 1.

Additionally, if desired, a plurality of holes 58, four in the preferred embodiment, may be formed through the lower part 36 of the back 32 of the belt 12, so as to readily permit the escape of any air or water which could be trapped between the lower back 36 of the belt 12 and the user 10, as could be introduced by jumping into the deep water 14 with the belt 12 on.

It is thought that the deep water exercise belt of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

We claim:

1. A deep water exercise belt, for placement about the waist of a user, comprising:
   a. a single homogeneous member of flexible buoyant material which is formed of uniform thickness and of varying width, the width of the buoyant material being substantially uniform at the sides of the user and expanding both upwards and downwards at the back of the user;
   b. the upward and downward expansion of the single homogeneous member of flexible buoyant material being mutually asymmetrical, the upward expansion being of greater extent than the downward expansion and including flexible buoyant material within and bounded by a single upwardly extending arc, having a single peak, and the downward expansion including flexible buoyant material within and bounded by two downward extending arcs which are symmetrically positioned about a vertical line extending downward from the peak of the upwardly extending arc; and
   c. A band for securing said single homogeneous member of flexible buoyant material tightly and securely about the waist of the user.

2. The deep water exercise belt, as recited in claim 1, wherein said member of buoyant material is formed with a plurality of openings about its length and said band intertwines through said openings about the entire length of said member of buoyant material, so that the band encircles the waist of the user and holds said buoyant material tightly against the waist of the user from the outside at a plurality of separate locations.

3. The deep water exercise belt, as recited in claim 1, where the single homogeneous member of flexible buoyant material is formed of chemically cross-linked polyethylene having a fine closed-cell structure.

4. The deep water exercise belt, as recited in claim 1, wherein the single homogeneous member of flexible buoyant material encircling the waist of the user is without additional covering, and, having an inside surface which faces adjacent the user's skin and an opposing outside exterior surface, the inside surface is formed to be smooth so as to provide a suction effect against the skin of the user.

5. The deep water exercise belt, as recited in claim 1, wherein the single, homogeneous member of flexible buoyant material encircling the waist of the user is without additional covering, and, having an inside surface which face adjacent the user's skin and an opposing outside exterior surface, the outside exterior surface is roughly textured to provide additional resistance to movement through water.

6. The deep water exercise belt, as recited in claim 1, wherein the uniform thickness of the single homogeneous member of flexible buoyant material is varied between different belts so as to alter the buoyancy for different sizes and builds of user.

7. A deep water exercise belt, for placement about the waist of a user, comprising:
   a. a single homogeneous member of flexible buoyant material, without additional covering, which is formed of uniform thickness and of varying width, the width of the buoyant material being substantially uniform at the sides of the user and expanding both upwards and downwards at the back of the user;
   b. the upward and downward expansion of the single homogeneous member of flexible buoyant material being mutually asymmetrical, the upward expansion being of greater extent than the downward expansion and including flexible buoyant material within and bounded by a single upwardly extending arc, having a single peak, and the downward expansion including flexible buoyant material within and bounded by two downward extending arcs which are symmetrically positioned about a vertical line extending downward from the peak of the upwardly extending arc;

c. the single homogeneous member of buoyant material without additional covering, having an inside surface which faces adjacent the user's skin and an opposing outside exterior surface, the inside surface is formed to be smooth so as to provide a suction effect against the skin of the user, and the outside exterior surface is roughly textured to provide additional resistance to movement through water; and d. a band for securing said single, homogeneous member of flexible buoyant material tightly and securely about the waist of the user, said member of buoyant material being formed with a plurality of openings about its length and said band intertwining through said openings about the entire length of said member of buoyant material, so that the band encircles the waist of the user and holds said buoyant material tightly against the waist of the user from the outside at a plurality of separate locations.

* * * * *